(12) United States Patent
Valkama

(10) Patent No.: US 6,864,823 B1
(45) Date of Patent: Mar. 8, 2005

(54) ENHANCED CONTROL OF AN ANALOG TO DIGITAL CONVERTER

(75) Inventor: Vesa Valkama, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/865,669

(22) Filed: Jun. 9, 2004

(51) Int. Cl.⁷ .............................................. H03M 1/12
(52) U.S. Cl. ...................................... 341/155; 341/141
(58) Field of Search ................................ 341/139, 141, 341/142, 155, 161, 162

(56) References Cited

U.S. PATENT DOCUMENTS

| | | | | |
|---|---|---|---|---|
| 5,886,658 A | * | 3/1999 | Amar et al. ................. | 341/155 |
| 6,201,492 B1 | * | 3/2001 | Amar et al. ................. | 341/155 |
| 6,239,732 B1 | * | 5/2001 | Cusey ......................... | 341/155 |
| 6,326,909 B1 | * | 12/2001 | Yamaguchi ................. | 341/120 |
| 6,414,620 B1 | * | 7/2002 | Maeda et al. ............... | 341/155 |
| 6,429,904 B2 | * | 8/2002 | Sani et al. ................... | 348/572 |
| 6,522,274 B1 | * | 2/2003 | Amar et al. ................. | 341/141 |

* cited by examiner

Primary Examiner—Michael Tokar
Assistant Examiner—Linh Van Nguyen

(57) ABSTRACT

The invention relates to a method, mixed signal integrated circuit, mobile communication device, system and computer program for controlling an analog-to-digital converter. To reduce latency and power consumption when accessing conversion results from analog signals the invention provides a method for controlling an analog-to-digital converter with transmitting control signals and data between the analog-to-digital converter and a digital circuit using a serial interface generating a read command within the digital circuit transmitting the read command from the digital circuit to the analog-to-digital converter via the serial interface receiving the read command in the analog-to-digital converter converting an analog signal from an input terminal of the analog-to-digital converter into a digital signal within the analog-to-digital converter providing the digital signal immediately after conversion to the serial interface and receiving the digital signal within the digital circuit via the serial interface immediately after the read command.

17 Claims, 4 Drawing Sheets

ENHANCED CONTROL OF AN ANALOG TO DIGITAL CONVERTER

FIELD OF THE INVENTION

The invention relates in general to a method for controlling an analog-to-digital converter with transmitting control signals and data between the analog-to-digital converter and digital circuit using a serial interface, and transmitting a read command from the digital circuit to the analog-to-digital converter via the serial interface.

The invention also relates in general to a system for converting an analog signal into a digital signal, the system comprising a digital circuit arranged to process digital signals, an analog-to-digital converter arranged to convert analog signals into digital signals, and a serial interface connecting the digital circuit with the analog-to-digital converter and transmitting control signals and data signals between the digital circuit and the analog-to-digital converter.

The invention also relates to a mixed signal circuit for processing analog and digital signals and comprising a serial interface for communicating with a digital circuit, input terminals for receiving analog signals and an analog-to-digital converter connected with the input terminals and the serial interface and arranged to convert the analog signals into digital signals.

Finally, the invention relates in general to a mobile communication device and a computer program product comprising a computer program for processing analog and digital signals.

BACKGROUND OF THE INVENTION

In general, electronic systems, such as mobile communication devices or consumer electronic devices, comprise digital circuits, which may be integrated circuits (digital ICs) to process data in digital format. However, within mobile communication devices or consumer electronic devices, also analog signals need to be processed. Therefore, these devices may comprise mixed signal circuits, which may be mixed signal integrated circuits (Mixed ICs). The mixed signal integrated circuits may provide conversion between analog signals and digital signals. The digital signals may be processed by the digital integrated circuits. Various analog signals and events may be processed within the mixed signal integrated circuit. After processing and A/D conversion, the signals may be routed to the digital integrated circuit.

Within mixed signal integrated circuits, analog-to-digital converters are embedded for converting the analog signals into digital signals. Digital-to-analog converters may as well be included to convert the digital signals into analog signals. The mixed signal integrated circuits connect the analog-to-digital converters with input terminals. The input terminals may be arranged to receive the analog signals. Multiple input terminals may be used. The signals on the input terminals may be multiplexed onto input terminals of the analog-to-digital converter. Within the analog-to-digital converter, the different signals may be converted within different time slots. The analog-to-digital converter may therefore convert various different analog signals into digital signals and may provide the digital signals to the digital integrated circuit.

The conversion of the analog signals into the digital signals needs to be controlled by the digital integrated circuits. Therefore, the mixed signal integrated circuits provide a serial interface. The serial interface may be responsible for transmitting control data and digital signals between the digital integrated circuit and the mixed signal integrated circuit. The digital signals may be processed within the digital integrated circuit and appropriate actions, such as control signals, may be generated or activated.

For controlling the mixed signal integrated circuit and the respective analog-to-digital converters, the software or the hardwired instructions within the digital integrated circuit may generate a write command. This write command may be a conversion command, instructing the analog-to-digital converter to convert analog input signals into digital signals. The write command may also comprise input channel selection data. This input channel selection data may be used within the analog-to-digital converter to select the respective input signal of one of various input terminals of the mixed signal integrated circuit.

Upon reception of the write command from the digital circuit via the serial interface, the analog-to-digital converter may execute an ordered conversion of the analog signal into a digital signal. The resulting digital signal may then be stored within a memory, located within the mixed signal integrated circuit, or located within an outside storage medium.

After the write command has been executed, the digital integrated circuit may be informed about finished execution. The digital integrated circuit may be informed about the finished execution, for example via the serial interface, a dedicated line, a dedicated interrupt or a dedicated signal, as well as by other information means. It may also be possible that the digital integrated circuit waits for a predefined latency time. The latency time may ensure completion of the conversion. The latency time may be larger than the actual processing time.

After conversion, the software of the digital integrated circuit, or hardwired instructions of the digital integrated circuit may generate a read command. This read command provides accessing the conversion results from the mixed signal integrated circuit. A read command is transferred to the mixed signal integrated circuit via the serial interface. Upon reception of the read command, the mixed-signal integrated circuit provides the conversion results from the memory through the serial interface to the digital integrated circuit. Within the digital integrated circuit, the digital signals may be used for further processing.

However, a drawback of these systems is that conversion of analog signals into digital signals and providing the digital signals to the digital integrated circuit requires the digital integrated circuit to access the mixed signal integrated circuit at least twice. The requirement of two temporal succeeding accesses may be imposed due to the serial interface. The serial interface is used to minimize the number of galvanic connection lines between the two circuits. As a serial interface only allows data transmission temporally serially, two separate accesses are required to transmit two separate control data sets, such as write and read command.

However, the use of the serial interface and the separate accesses imposes a drawback of latency for accessing converted analog signals. Latency between two conversions may be caused by having at least two mandatory serial accesses. Latency may also be caused due to jamming on the serial interface. Accessing the interface when the analog-to-digital converter or the mixed signal integrated circuit is accessed may not be possible. Therefore, reducing traffic within the interface would reduce latency. In addition, power consumption is increased, as accessing the mixed signal integrated circuit twice requires twice the amount of power as accessing the mixed signal integrated circuit once.

SUMMARY OF THE INVENTION

To reduce latency, and power consumption, embodiments of the invention provide a method for controlling an analog-to-digital converter with transmitting control signals and data between the analog-to-digital converter and a digital circuit using a serial interface, transmitting a read command from the digital circuit to the analog-to-digital converter via the serial interface, receiving the read command in the analog-to-digital converter, converting an analog signal from an input terminal of the analog-to-digital converter into a digital signal within the analog-to-digital converter after reception of the read signal, providing the digital signal immediately after conversion to the serial interface, and receiving the digital signal within the digital circuit via the serial interface.

Providing the digital signal immediately after conversion may result in transmitting the signal bit by bit. Once a bit is available from conversion it may, for example, be transferred. For example, in case a ten bit data set is the result of the conversion, the first bit may already be available and transferred while the last bit will be sent 10 clock cycles later. For example, the first bit may be the most significant bit, which becomes available with the first clock cycle. The least significant bit will become available with the $10^{th}$ clock cycle. At the last clock cycle, already nine bits have been transferred. As a result, the conversion result is transferred completely immediately after conversion.

By providing the conversion results immediately after conversion to the serial interface, the digital circuit may receive the digital signal immediately and storing the data at the mixed signal integrated circuit may be omitted. The reception of a read signal may initiate immediately the conversion and the conversion results may be provided on-line to the serial interface. The finite state machine (FSM) of the serial interface of mixed signal circuits or the analog-to-digital converter may be programmed such that conversion is started only after reception of the read signal.

Further, the conversion results may be routed to the serial interface on-line after conversion, without storing the results. Routing the output of the analog-to-digital converter directly to the serial interface may reduce system latency and increase processing speed. For instance, the FSM of the digital integrated circuit need not be adapted to the new solution. However, to reduce system latency further and to increase processing speed, adaptation may also be possible.

The latency time between subsequent conversions may be halved, since one of the two serial accesses from the digital circuit to the analog-to-digital converter may be omitted. In cases where a waveform of a varying signal, for example a voltage of a battery charger, needs to be analyzed through repeated measurements, reduced latency may improve charging results. Moreover, consumed energy for accessing the analog-to-digital converter may be reduced, as fewer accesses are necessary to obtain the same results. The removal of one of two serial accesses per conversion may account for reduced energy consumption. The received result of the analog-to-digital conversion may be the most recent one, as no storage during converting and transferring the results to the digital circuit is necessary.

Embodiments provide for generating of a write command including input channel selection. Transmitting the write command comprising input channel selection data prior to transmitting the read command from the digital circuit to the analog-to-digital converter via the serial interface may also be possible.

In such a case, the FSM of the digital circuit needs no changes. According to the embodiments, the conversion of the analog signal to a digital signal is not initiated directly after reception of the write command. The input channel selection data may be stored in the analog-to-digital converter and used for further processing. The reaction of the analog-to-digital converter or mixed signal integrated circuit is transparent, e.g. from outside, for example the digital circuit, no differences may be detected.

However, to provide the most current conversion results, embodiments provide for converting the analog signal from the respective input terminal of the analog-to-digital converter corresponding to the input channels selection data previously received with the write command, after reception of the read command. The input channel selection data may be stored from the previous write command. The conversion may, however, only be started after reception of the read command. For subsequent read commands, the respective input channel selection data of a previous write command may be used. The number of commands on the serial interface may be reduced from N+N to 1+N, where N is the number of conversion results to be acquired.

With prior art systems, each read command required a previous write command for selecting the respective input channel. According to embodiments, the input signal may be selected from a previous write command for successive read commands, omitting the write command prior to each read command.

Insofar as embodiments provide for converting the analog signal from the previously selected input channel upon reception of successive read commands, more than one read command may use the selected input channel.

Latency reduction may be increased according to embodiments, which provide for transmitting the read command including input channel selection data, and converting the analog signal from the respective input terminal of the analog-to-digital converter corresponding to the input channel selection data received with the read command.

According to these embodiments, each read command may already comprise input channel selection data. During generating of the read command, the input channel selection data may already be included. A write command may be omitted completely. The analog-to-digital converter may provide the conversion results immediately after reception of a read command. No input channel selection data needs to be stored. The number of commands on the serial interface may be reduced to N, with N being the number of accesses, compared to 1+N according to the previous embodiments or N+N according to prior art systems.

A FSM of the digital circuit needs to be adapted accordingly, to provide the input channel selection data together with the read command, and to omit the write command. The serial interface needs to transmit only the read command comprising the input channel selection data. The conversion begins and the results may be transferred between the digital circuit and the analog-to-digital converter.

The serial interface may be part of a mixed signal circuit. The analog-to-digital converter may be embedded within the mixed signal circuit. The analog-to-digital converter may comprise control terminals. According to embodiments, receiving control signals via control terminals of the analogto-digital converter is provided for. The control terminals of the analog-to-digital converter may be connected with the serial interface. The mixed signal circuit may provide the received control signals to the respective control terminals of the analog-to-digital converter.

Embodiments also provide output terminals of the analog-to-digital converter, the output terminals providing the digital results of the conversion. The mixed signal circuit may provide the digital signals from the output terminals of the analog-to-digital converter to the serial interface, providing the digital circuit with the conversion results.

To provide the conversion result without latency, embodiments provide for routing the digital signal of the analog-to-digital converter directly after conversion from the analog-to-digital converter to the serial interface. The direct routing allows providing the conversion results immediately.

Embodiments provide the analog-to-digital conversion within a mixed signal integrated circuit. Embedding the analog-to-digital converter within the mixed signal integrated circuit improves processing quality.

Further embodiments provide the analog-to-digital conversion using a successive approximation register type of A/D converter.

A further aspect of the invention is a system for converting an analog signal into a digital signal, comprising a digital circuit arranged to process digital signals, an analog-to-digital converter arranged to convert analog signals into digital signals; and a serial interface connecting the digital circuit with the analog-to-digital converter and transmitting control signals and data signals between the digital circuit and the analog-to-digital converter wherein the analog-to-digital converter is arranged such that upon reception of a read signal via the serial interface an analog signal is converted into a digital signal and that the digital signal is provided to the serial interface immediately after conversion from the analog signal.

Another aspect of the invention is a mixed signal circuit for processing analog and digital signals comprising a serial interface for communication with a digital circuit and input terminals for receiving analog signals, and an analog-to-digital converter connected with the input terminals and the serial interface and arranged to convert the analog signals into digital signals, and arranged to convert an analog signal into a digital signal upon reception of a read signal via the serial interface and to provide the digital signal to the serial interface immediately after conversion from the analog signal.

One other aspect of the invention is an electronic device comprising such a system or such a mixed signal integrated circuit.

Yet, another aspect of the invention is a mobile communication device comprising a previously described electronic device.

Yet, a further aspect of the invention is a computer program product comprising a computer program for processing analog and digital signals, the program comprising instructions operable to cause a processor to receive analog signals via input terminals, convert the analog signals into digital signals within an analog-to-digital converter upon reception of a read signal via the serial interface, and provide the digital signal directly to the serial interface immediately after conversion from the analog signal.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE DRAWINGS

In the figures like reference numbers refer to like elements, were appropriate.

Figure 1:
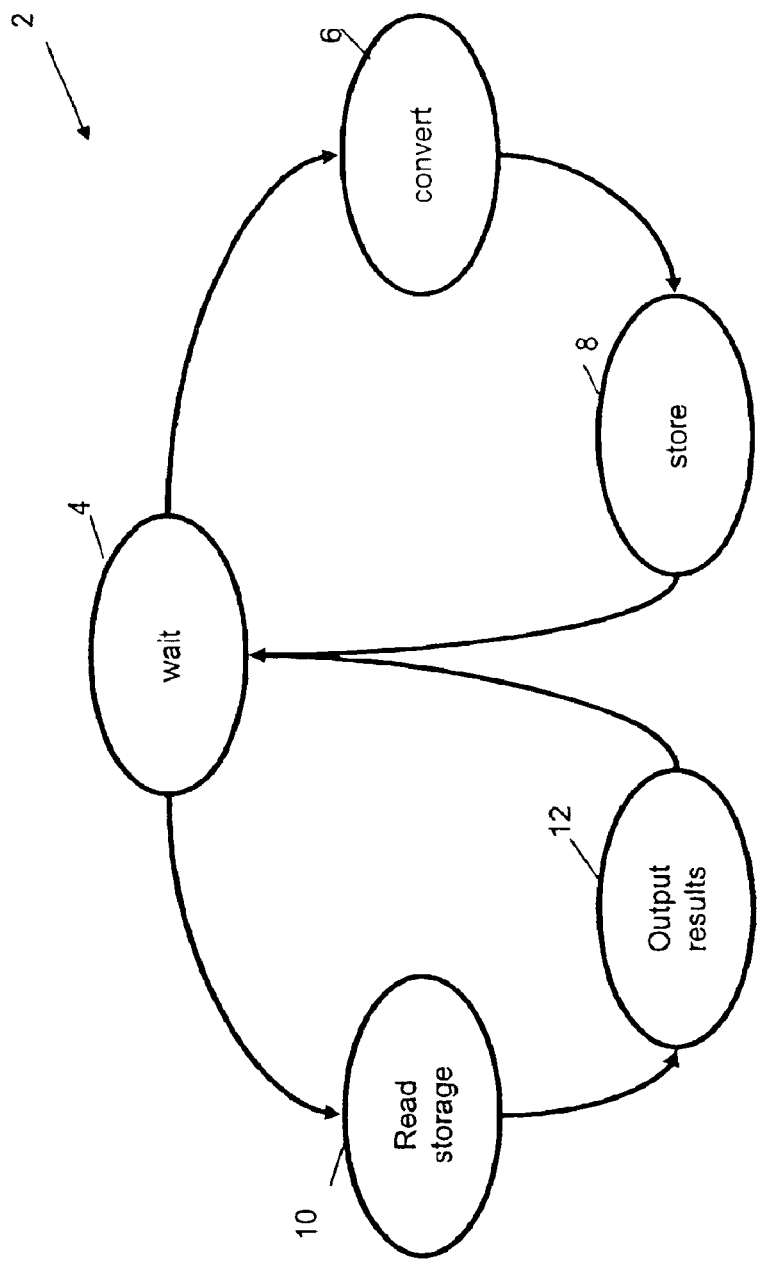
FIG. 1: shows a prior art state machine of a mixed signal integrated circuit.

FIG. 1 illustrates a finite state machine 2 of a mixed signal integrated circuit according to prior art. The finite state machine 2 usually is in a wait state 4. Upon reception of a write command, comprising input channel selection data, the finite state machine 2 changes from wait state 4 into conversion state 6. In conversion state 6, the mixed signal integrated circuit converts analog signals of the respective input channel into digital signals. The input channel for conversion is selected according to the input channel selection data received with the write command.

After conversion of the analog signals into digital signals is completed, the conversion results are stored and the finite state machine 2 therefore changes into storage state 8. After storing the conversions results is completed, the finite state machine 2 changes again into wait state 4.

Wait state 4, conversion state 6, and storage state 8 illustrate the necessary steps to be taken, when a write command is received from a digital integrate circuit. However, the digital integrated circuit still has not received the conversion results.

Therefore, the mixed signal integrated circuit may, when it is in wait state 4 receive a read command from the digital integrated circuit. Upon reception of a read command the finite state machine 2 changes into read storage state 10. In storage state 10, the stored conversion results are read from their storage.

After the results are read from the storage, the results are output and provided to serial interface in state 12. After all results are provided to the serial interface, the finite state machine 2 again changes into wait state 4.

To retrieve conversion results of analog signals, first the states 4, 6, 8 are necessary. Then, states 4, 10, 12 need to be processed. As can be seen, the provision of these different states produces latency to the retrieval of conversion results.

Figure 2:
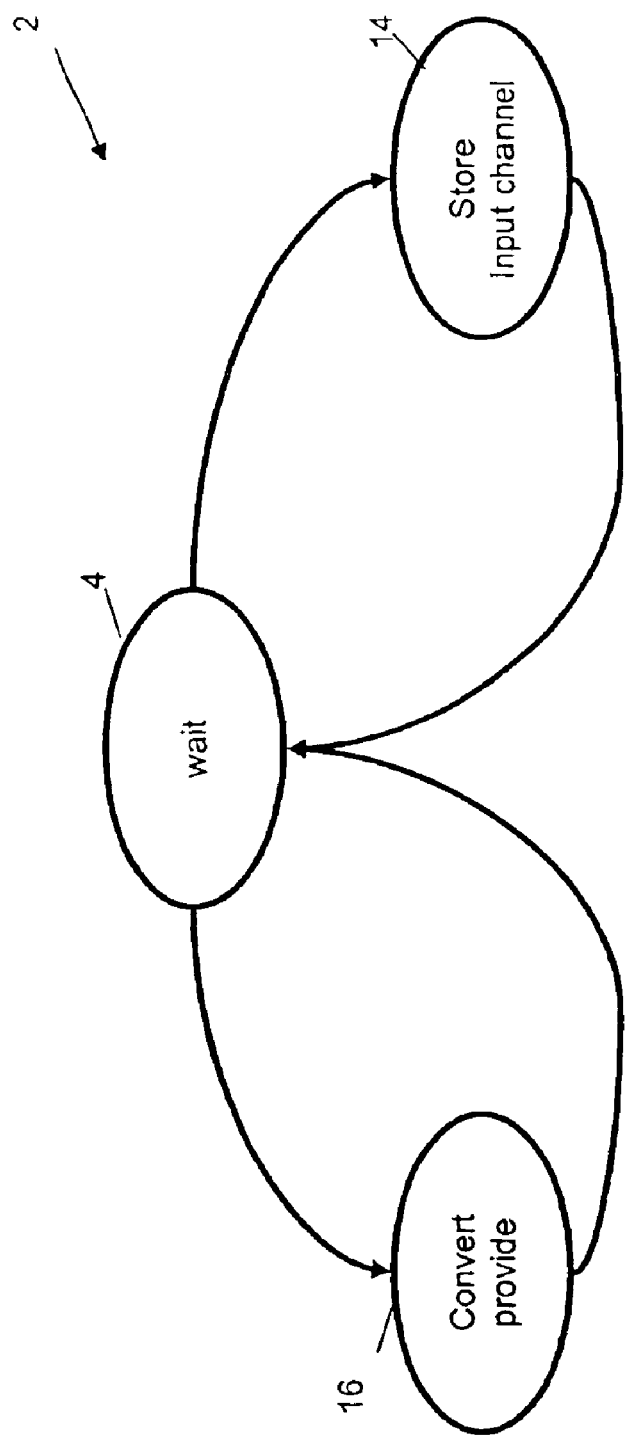
FIG. 2: illustrates a first state machine of mixed signal integrated circuit according to an inventive embodiment.

FIG. 2 shows a finite state machine 2 according to one exemplary embodiment of the invention. Upon reception of a write signal, the finite state machine 2 changes from wait state 4 into store input channel state 14. The write command comprises input channel selection data. This input channel selection data is stored in state 14. After storage of input channel selection data is completed, the finite state machine 2 changes into wait state 4.

When read commands are received, finite state machine 2 changes into conversion and provision state 16. For all successive read commands, in conversion and provision state 16, the previously stored input channel selection data is used for selecting the input channel and converting the respective analog signal into a digital signal. After or during conversion of the analog signal into the digital signal, the conversion results are provided to the serial interface directly. No intermediate storage is provided.

After the conversion is complete and the results are transferred, finite state machine 2 again changes back into wait state 4. The reception of a following read command causes finite state machine 2 to change again into conversion and provision state 16, wherein the previously stored input channel selection data of a previous write command is used again.

The number of accesses for accessing conversion results is reduced from N+N to 1+N, with N the number of commands. As previously received input channel selection data may be used again, it is not necessary to transmit input channel selection data prior to each read command. However, for changing an input channel, one write command may still be necessary.

Figure 3:
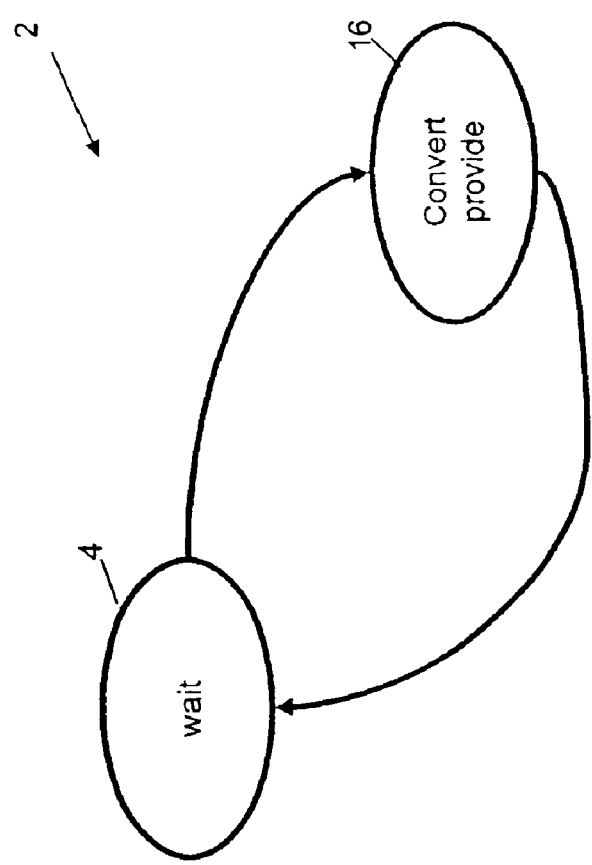
FIG. 3: illustrates a second finite state machine of a mixed signal integrated circuit of an embodiment of the invention.

FIG. 3 shows a finite state machine 2 of a further exemplary embodiment of the invention. The finite state machine 2 may in wait state 4 receive a read command. This read command may comprise input a channel selection data. After reception of this read command, finite state machine 2 changes into conversion and provision state 16. Within conversion and provision state, the analog signal of a corresponding analog input terminal may be converted into a digital signal. The respective analog input terminal may be determined from the read command, as the read command already comprised input channel selection data. The write command may therefore be omitted. After conversion is complete or even during conversion, the results, for example the bits which are already provided from the conversion, may be provided on-line to the serial interface.

Insofar as the digital integrated circuit receives the conversion results immediately, intermediate storage may be omitted. After a conversion is complete, and conversion results are provided to the serial interface, finite state machine 2 changes back again into wait state 4, waiting for further read commands from the digital integrated circuit.

Figure 4:
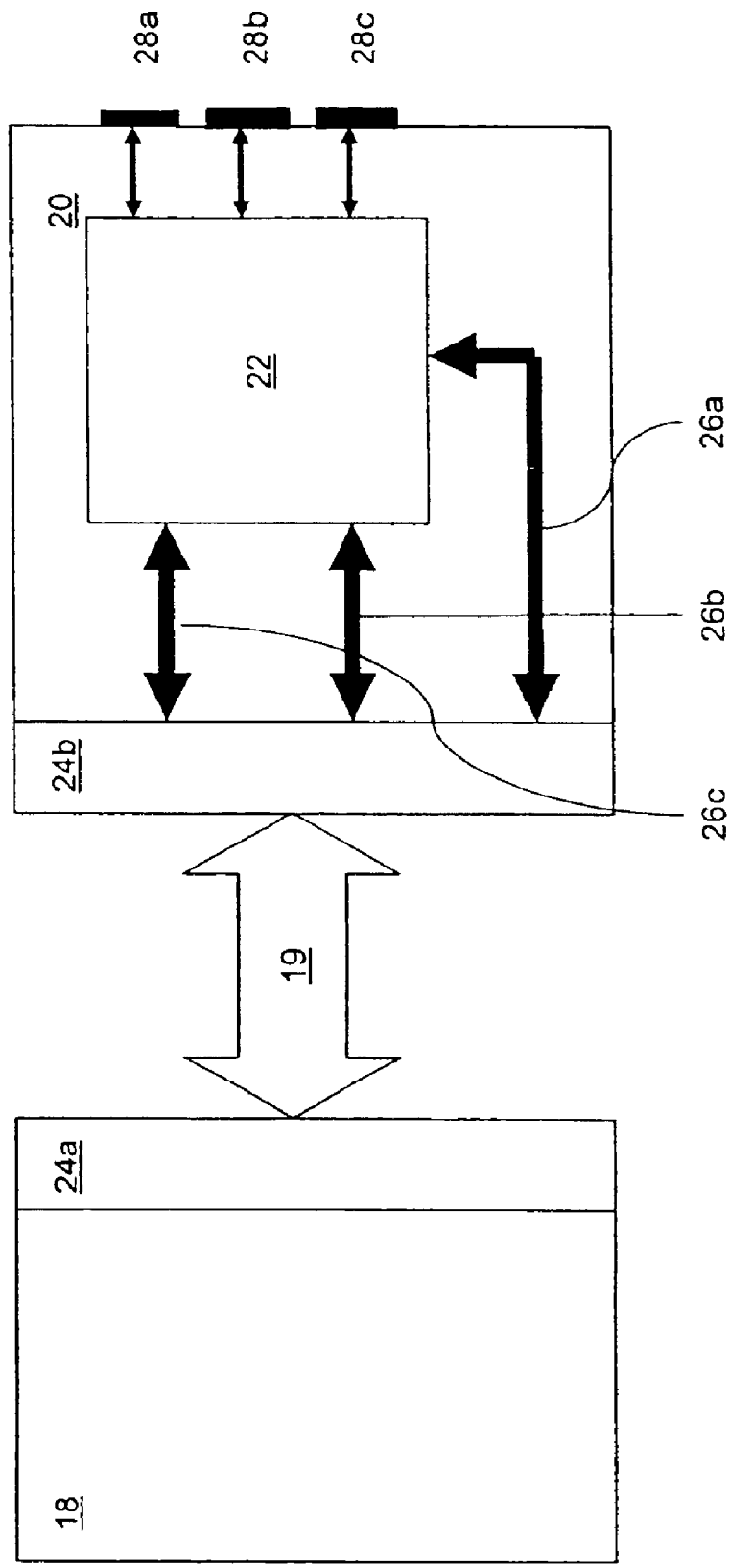
FIG. 4: illustrates a system comprising a digital integrated circuit and a mixed signal integrated circuit.

FIG. 4 illustrates a system arranged for providing the inventive method. Illustrated are a digital integrated circuit 18 and a mixed signal integrated circuit 20. Digital integrated circuit 18 and mixed signal integrated circuit 20 are connected via serial bus 19. Serial bus 19 is connected with respective serial interfaces 24a, 24b.

Within mixed signal integrated circuit 20 are embedded serial interface 24b, analog-to-digital converter 22, address bus 26a, data bus 26b, control bus 26c, and analog signal input terminal 28. The busses 26 may be single lines for serial transfer of data as well as multiple lines for parallel transfer of data.

Analog input terminals 28 are connected with respective input terminals of analog-to-digital converter 22. Address bus 26a allows selecting one of the respective input terminals of analog-to-digital converter 22. Data bus 26b allows transferring data between analog-to-digital converter 22 and serial interface 24b. Control bus 26c allows transmitting control information between serial interface 26b and analog-to-digital converter 22.

Serial interface 24b may implement a computer program or may comprise hardwired instructions to implement the inventive system.

For retrieving respective digital signals converted from the respective analog input terminals 28, digital integrated circuit 18 may transmit a read command via its serial interface 24a over serial bus 19 to serial interface 24b. The read command may comprise input channel selection data, determining which of the analog input terminals 28 are to be used for analog-to-digital conversion. Within serial interface 24b, the input channel selection data is extracted. Using the input channel selection data, address bus 26a instructs analog-to-digital converter 22 to select the respective input terminal for reading out analog signals from the respective analog input terminal 28 a, b, c.

The read command is further used for transmitting from serial interface 24b via control bus 26c instructions to start conversion of analog signals to digital signals. The respective signal from input terminal 28 is converted into a digital signal. Via data bus 26b, the results of analog-to-digital conversion is immediately provided to serial interface 24b. Within serial interface 24b, the conversion results are taken from data bus 26b and transmitted via serial bus 19 to serial interface 24a of digital integrated circuit 18.

The inventive system allows accessing conversion results immediately using one single read command without the need to store the conversion results within mixed signal integrated circuit 20. Latency of accessing data and power consumption may be reduced, as only one command is necessary for accessing the respective data.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling an analog-to-digital converter with:
   transmitting control signals and data between the analog-to-digital converter and a digital circuit using a serial interface;
   transmitting a read command from the digital circuit to the analog-to-digital converter via the serial interface;
   receiving the read command in the analog-to-digital converter;
   converting an analog signal from an input terminal of the analog-to-digital converter into a digital signal within the analog-to-digital converter after reception of the read signal;
   providing the digital signal immediately after conversion to the serial interface; and
   receiving the digital signal within the digital circuit via the serial interface.

2. The method of claim 1, with transmitting a write command comprising input channel selection data prior to transmitting the read command from the digital circuit to the analog-to-digital converter via the serial interface.

3. The method of claim 2, with converting the analog signal from the respective input terminal of the analog-todigital converter corresponding to the input channel selection data previously received with the write command, after reception of the read command.

4. The method of claim 2, with converting the analog signal from the previously selected input channel upon reception of successive read commands.

5. The method of claim 1, with transmitting the read command including input channel selection data, and converting the analog signal from the respective input terminal of the analog-to-digital converter corresponding to the input channel selection data received with the read command.

6. The method of claim 1, with receiving control signals via control terminals of the analog-to-digital converter.

7. The method of claim 1, with providing digital signals at output terminals of the analog-to-digital converter.

8. The method of claim 1, with routing the digital signal of the analog-to-digital converter directly after conversion from the analog-to-digital converter to the serial interface.

9. The method of claim 1, with providing the analog-to-digital conversion within a mixed signal integrated circuit.

10. The method of claim 1, with providing the analog-to-digital conversion using a successive approximation register.

11. A system for converting an analog signal into a digital signal, comprising
   a digital circuit arranged to process digital signals;
   an analog-to-digital converter arranged to convert analog signals into digital signals; and
   a serial interface connecting the digital circuit with the analog-to-digital converter and transmitting control signals and data signals between the digital circuit and the analog-to-digital converter;
   wherein
   the analog-to-digital converter is arranged such that upon reception of a read signal via the serial interface an analog signal is converted into a digital signal and that the digital signal is provided to the serial interface immediately after conversion from the analog signal.

12. A mixed signal circuit for processing analog and digital signals comprising:
   a serial interface for communication with a digital circuit,
   input terminals for receiving analog signals, and
   an analog-to-digital converter connected with the input terminals and the serial interface and arranged to convert the analog signals into digital signals, and
   arranged to convert an analog signal into a digital signal upon reception of a read signal via the serial interface and to provide the digital signal to the serial interface immediately after conversion from the analog signal.

13. An electronic device comprising a system for converting an analog signal into a digital signal, comprising
   a digital circuit arranged to process digital signals;
   an analog-to-digital converter arranged to convert analog signals into digital signals; and
   a serial interface connecting the digital circuit with the analog-to-digital converter and transmitting control signals and data signals between the digital circuit and the analog-to-digital converter;
   wherein
   the analog-to-digital converter is arranged such that upon reception of a read signal via the serial interface an analog signal is converted into a digital signal and that the digital signal is provided to the serial interface immediately after conversion from the analog signal.

14. A mobile communication device comprising an electronic device of claim 13.

15. An electronic device comprising a mixed signal circuit for processing analog and digital signals comprising:
   a serial interface for communication with a digital circuit,
   input terminals for receiving analog signals, and
   an analog-to-digital converter connected with the input terminals and the serial interface and arranged to convert the analog signals into digital signals, and
   arranged to convert an analog signal into a digital signal upon reception of a read signal via the serial interface and to provide the digital signal to the serial interface immediately after conversion from the analog signal.

16. A mobile communication device comprising an electronic device of claim 15.

17. A computer program product comprising a computer program for processing analog and digital signals,
   the program comprising instructions operable to cause a processor to receive analog signals via input terminals,
   convert the analog signals into digital signals within an analog-to-digital converter upon reception of a read signal via the serial interface, and
   provide the digital signal directly to the serial interface immediately after conversion from the analog signal.

* * * * *